(12) United States Patent
Nishikawa et al.

(10) Patent No.: US 6,672,653 B2
(45) Date of Patent: Jan. 6, 2004

(54) REAR VEHICLE BODY STRUCTURE

(75) Inventors: Masaharu Nishikawa, Kanagawa-ken (JP); Michio Kudo, Kanagawa-ken (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/268,679

(22) Filed: Oct. 11, 2002

(65) Prior Publication Data

US 2003/0071490 A1 Apr. 17, 2003

(30) Foreign Application Priority Data

Oct. 15, 2001 (JP) .................................... P2001-317013

(51) Int. Cl.[7] ............................................. B62D 25/20
(52) U.S. Cl. ................... 296/203.04; 296/205; 296/209
(58) Field of Search ................................. 296/195, 198, 296/203.04, 209, 205, 193.05, 193.07, 193.08

(56) References Cited

U.S. PATENT DOCUMENTS

| | | | | | |
|---|---|---|---|---|---|
| 3,528,699 A | * | 9/1970 | Wessells, III | ............... | 296/209 |
| 4,471,992 A | * | 9/1984 | Matsuura et al. | ........... | 296/209 |
| 4,557,519 A | * | 12/1985 | Matsuura | .................... | 296/204 |
| 4,669,776 A | * | 6/1987 | Harasaki | .................... | 296/194 |
| 5,228,741 A | * | 7/1993 | Ide | .............................. | 296/188 |
| 5,560,674 A | * | 10/1996 | Tazaki et al. | ................ | 296/193 |

FOREIGN PATENT DOCUMENTS

| | | | | |
|---|---|---|---|---|
| DE | 4020363 A1 | * | 1/1992 | ........... B62D/21/02 |
| EP | 0 943 531 A2 | | 9/1999 | |
| JP | 58-133967 A | | 8/1983 | |
| JP | 09254828 A | * | 9/1997 | ........... B62D/25/20 |
| JP | 10-297541 A | | 11/1998 | |
| JP | P2000-255457 A | | 9/2000 | |
| JP | 2001-247056 | | 9/2001 | |

* cited by examiner

Primary Examiner—Dennis H. Pedder
Assistant Examiner—Patricia L. Engle
(74) Attorney, Agent, or Firm—McDermott, Will & Emery

(57) ABSTRACT

A rear vehicle body structure including a rear side member, a side sill inner, and a rear floor. The rear side member includes a front portion connected to the side sill inner, a middle portion, and a rear portion disposed on a transversely inner side of the front portion. The rear portion has a first wall on its transversely outer side, and the middle portion has a second wall continuously provided from the first wall to the front portion. The side sill inner has a third wall accommodated within width of the rear side member and connected to the rear side member and the rear floor. The third wall has, on its rear end, a flange portion fixed to the rear side member at a vicinity of a transition point from the first wall to the second wall, on substantially the same plane as the third wall.

7 Claims, 4 Drawing Sheets

REAR VEHICLE BODY STRUCTURE

BACKGROUND OF THE INVENTION

1. Field of the Invention

The present invention relates to a rear body structure for a vehicle, particularly a body structure around a rear floor.

2. Description of the Related Art

Japanese Unexamined Patent Publication No. 2000-255457 discloses a rear car body structure including a side sill provided on an outer side of a vehicle transverse direction and extended substantially in a straight manner in a vehicle longitudinal direction, and a rear side member connected to a rear portion of a side sill inner of the side sill and extended substantially straight in the vehicle longitudinal direction.

SUMMARY OF THE INVENTION

In foregoing rear car body structures, a rear portion of a rear side member is extended rearward from a transversely inner part of an offset portion of the rear side member in a vicinity of a front part of a rear wheel house. Consequently, impact force of a rear end collision is not smoothly transmitted from the rear side member to the side sill inner, breaking off the rear side member from the offset portion. An increase in thickness of a plate of the rear side member to prevent such breakage results in weight increase and poor press formability.

It is an object of the present invention to provide a rear vehicle body structure smoothly transmitting impact force of vehicle rear end collision from a rear side member to a side sill inner without increasing the plate thickness of the rear side member.

An aspect of the present invention is a rear vehicle body structure comprising: a rear side member including a front portion in front of a rear wheel house, extending in a vehicle longitudinal direction, a rear portion disposed on a transversely inner side of the front portion, extending in the vehicle longitudinal direction, and having a first wall on a transversely outer side thereof, and a middle portion having a second wall continuously provided from a front end of the first wall of the rear portion to a transversely outer rear end of the front portion; a longitudinally extending side sill inner, a rear portion of which is connected transversely outside the front portion of the rear side member; and a rear floor connected onto the rear side member and the side sill inner, wherein the rear portion of the side sill inner comprises a third wall configured to be accommodated within width of the rear side member to connect a bottom portion of the rear side member with the rear floor, and wherein the third wall of the side sill inner has, on its rear end, a flange portion configured to be fixed to the rear side member at a vicinity of a transition point from the first wall to the second wall, on substantially the same plane as the third wall.

BRIEF DESCRIPTION OF THE DRAWINGS

The invention will now be described with reference to the accompanying drawings wherein.

DETAILED DESCRIPTION OF THE PREFERRED EMBODIMENT

Figure 1:
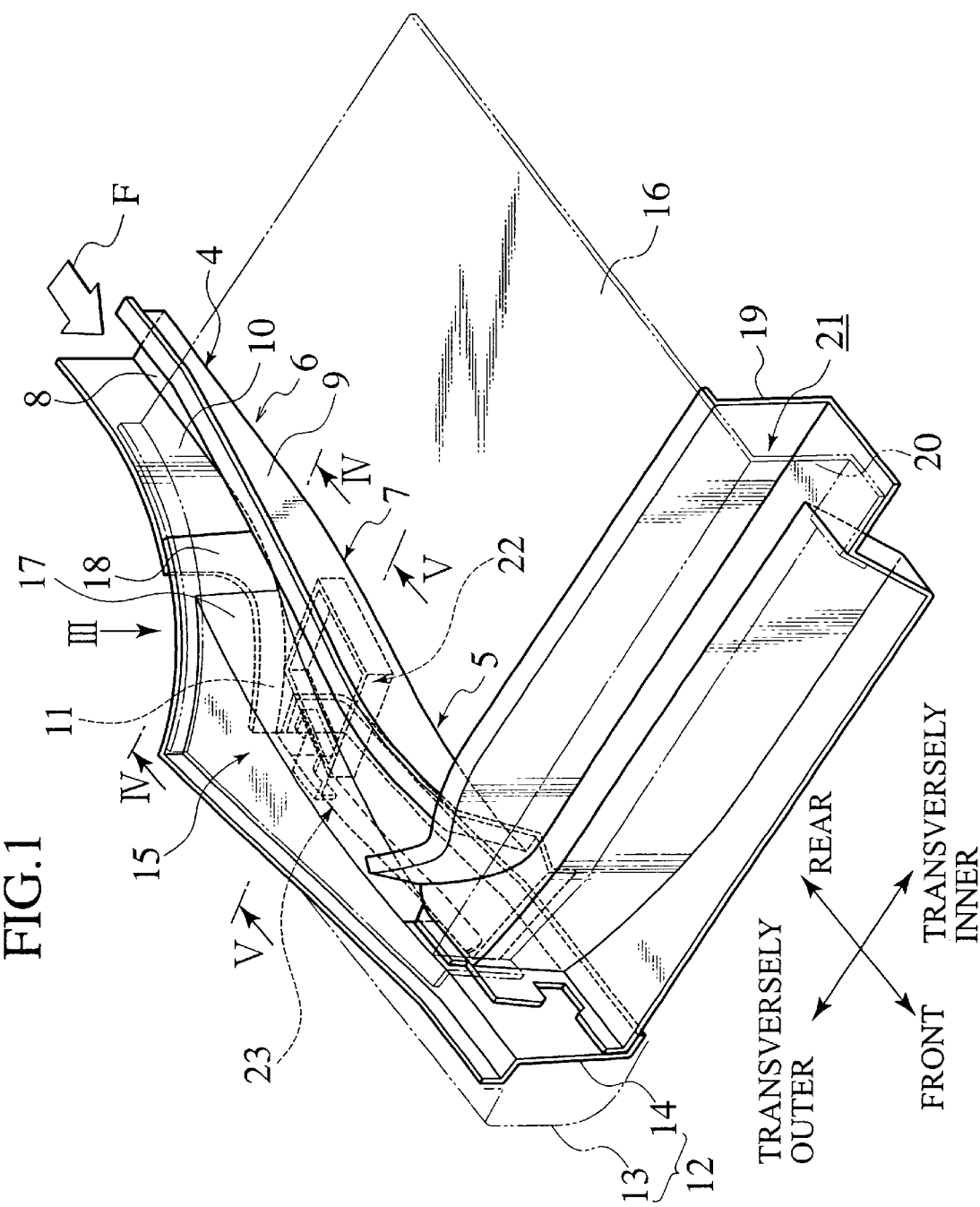
FIG. 1 is a perspective view showing a rear vehicle body structure surrounding a rear floor according to an embodiment of the present invention, specifically the structure of a right side of a vehicle traveling direction.
Figure 2:
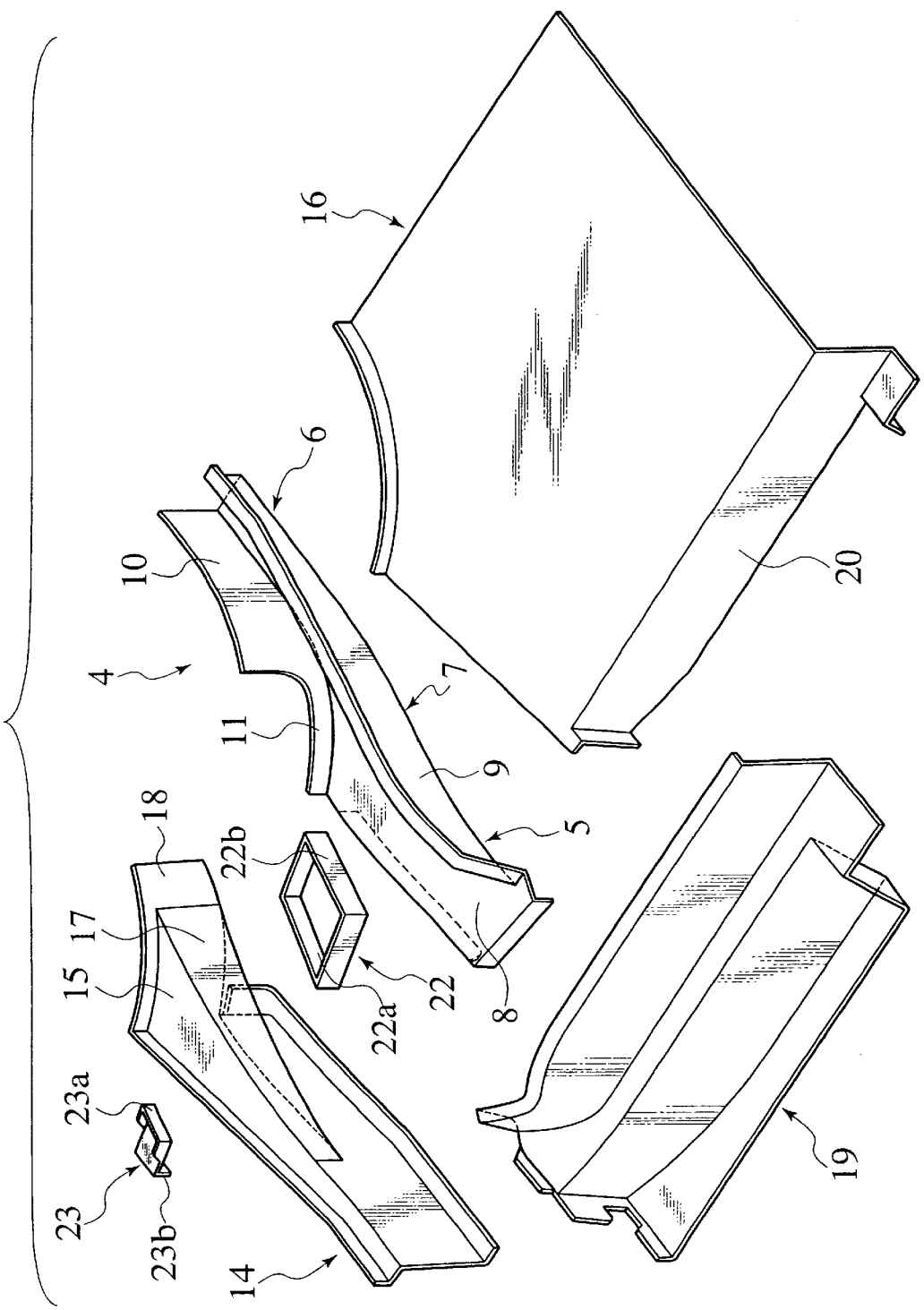
FIG. 2 is an exploded perspective view of the rear vehicle body structure of FIG. 1.

An embodiment of the present invention will be explained below with reference to the drawings, wherein like members are designated by like reference characters. A rear vehicle body structure of a left side of a vehicle traveling direction is similar to that of a right side of the vehicle traveling direction of FIG. 1, and thus description thereof will be omitted.

Figure 3:
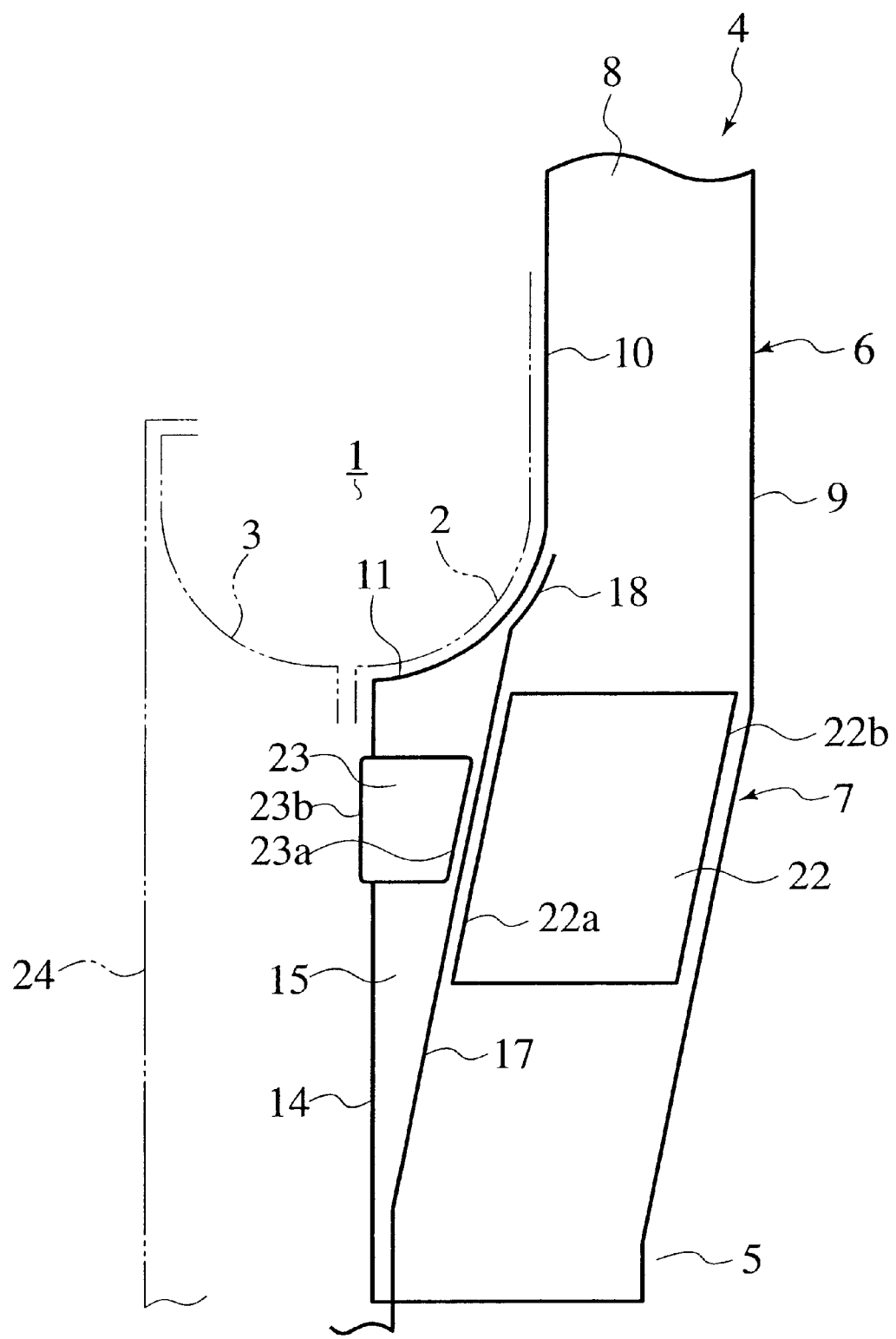
FIG. 3 is a schematic plan view seen from an arrow direction III in FIG. 1.
Figure 4:
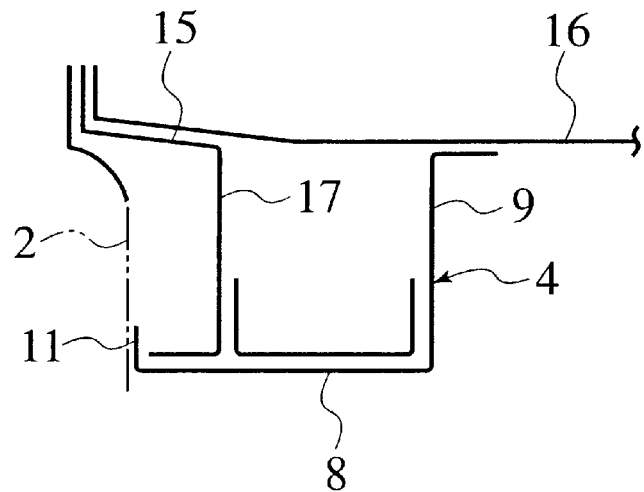
FIG. 4 is a schematic sectional view taken along the line IV—IV of an arrow direction in FIG. 1.
Figure 5:
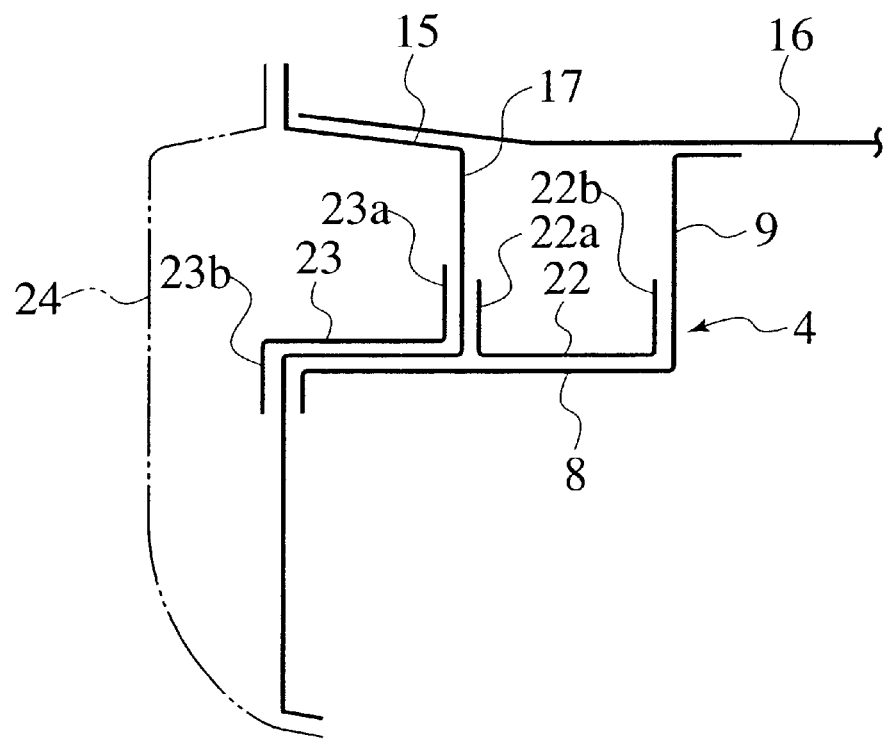
FIG. 5 is a schematic sectional view taken along the line V—V of an arrow direction in FIG. 1.

A rear wheel house 1 includes a wheel house inner 2 and a wheel house outer 3 (see FIG. 3). A rear side member 4 is extended rearward from a front side of the rear wheel house 1 around an inner side of the rear wheel house 1 in a vehicle transverse direction. The rear side member 4 includes a front portion 5 disposed on the front side of the rear wheel house 1 to be extended in a vehicle longitudinal direction, a rear portion 6 disposed behind the front portion 5 to be longitudinally extended along the transversely inner side, and an offset portion 7 positioned between the front and rear portions 5 and 6. A body side outer 24 is provided in the front from the rear wheel outer 3.

On a transversely inner side of a bottom portion 8 of the rear side member 4, a curvilinear upward wall portion 9 is longitudinally extending with its rear end offset transversely inside relative to its front end. The front portion 5 of the rear side member 4 has an L-shaped section composed of the bottom portion 8 and the wall portion 9. The rear portion 6 of the rear side member 4 has a upward wall portion 10 longitudinally extending along a transversely outer side of the bottom portion 8, which constitutes a U-shaped section of the rear portion 6 with the bottom portion 8 and the wall portion 9. In addition, the offset portion 7 includes a low upward curved wall portion 11 continuously provided between a transversely outer rear end of the front portion 5 and a front end of the wall portion 10 formed on the transversely outer side of the rear portion 6. This curved wall portion 11 has a shape corresponding to the shape of the wheel house inner 2, and is connected to a transversely inside of the wheel house inner 2.

On the front of the rear wheel house 1, a side sill 12 is disposed so as to extend in a substantially straight manner in the vehicle longitudinal direction. This side sill 12 has a closed sectional structure composed of a side sill outer 13 and a side sill inner 14, thereby providing rigidity to a vehicle body side. The front portion 5 of the rear side member 4 is connected to a transversely inside of a rear portion of the side sill inner 14.

On an upper portion of the rear portion of the side sill inner 14, a protruded portion 15 gradually protrudes transversely inward from a main surface of the side sill inner 14 as it approaches rearward so as to be accommodated in a sectional inside of the rear side member 4. This protruded portion 15 is placed on the bottom portion 8 of the rear side member 4, and a rear floor 16 is placed on the protruded portion 15. The rear floor 16 is connected onto the wall portion 9 on the transversely inner side of the rear side member 4. A longitudinally extending wall portion 17 provided on a transversely inner side of the protruded portion 15 is positioned within width (or the sectional inside) of the rear side member 4, and erected from the bottom portion 8 thereof to connect the bottom portion 8 with an undersurface of the rear floor 16. A flange portion 18 formed on a rear end of the wall portion 17 is connected to the rear side member 4 at a vicinity of the transition point from the wall portion 10 to the curved wall portion 11 and substantially on the same plane as that of the wall portion 17. Here, "substantially on the same plane" does not mean a plane strictly identical to that of the wall portion 17. It only means that the flange portion 18 needs to be continuous somewhat smoothly with the wall portion 17 and not be extremely bent. Accordingly, the wall portion 10 of the rear side member 4 and the wall portion 17 of the protruded portion 15 of the side sill inner 14 are interconnected by the flange portion 18, forming a curvilinear surface extending in the vehicle longitudinal direction. Then, a box-shaped closed sectional structure which is composed of the continuously connected wall portions 10 and 17 and the flange portion 18, the wall portion 9 of the rear side member 4 disposed substantially in parallel to these, the bottom portion 8 of the rear side member 4 and the rear floor 16, is formed to have a longitudinally extending curvilinear shape with its rear end offset transversely inside relative to its front end.

An end of a rear cross member 19 extended in the vehicle transverse direction is connected to a front part of the protruded portion 15 of the side sill inner 4. This rear cross member 19 has a section bent in a crank shape. The rear floor 16 and a cover portion 20 formed downward from its front end are connected to the rear cross member 19 to form a closed section 21 along the vehicle transverse direction, thereby increasing vehicle body rigidity.

The sectional inside of the rear side member 4 is partitioned into transversely inner and outer sides by the wall portion 17 of the protruded portion 15. Inside the sections of the partitioned inner and outer sides, respectively, first and second reinforcements 22 and 23 are provided to support a rear suspension (not shown). The first reinforcement 22 has a shape of an upper side opened container with its bottom portion connected to the bottom portion 8 of the rear side member 4. An upward flange 22a on its transversely outer side is connected to the wall portion 17 of the protruded portion 15. An upward flange 22b on its transversely inner side is connected to the wall portion 9 of the rear side member 4. The second reinforcement 23 has, on its transversely inner side, an upward flange 23a connected to the wall portion 17 of the protruded portion 15, and on its transversely outer side, a downward flange 23b connected to the main surface of the side sill inner 14.

According to the described embodiment, since the wall portion 17 is accommodated within the sectional inside of the rear side member 4 to connect the bottom portion 8 of the rear side member 4 with the rear floor 16, the geometric moment of inertia of the rear side member 4 is increased. The flange portion 18 formed on the rear end of the wall portion 17 is connected to the rear side member 4 at the vicinity of the transition point from the wall portion 10 to the curved wall portion 11, substantially on the same plane as the wall portion 17. Accordingly, the impact force F of a vehicle rear end collision can be smoothly transmitted from the rear side member 4 to the side sill inner 14. Thus, a plate of the rear side member 4 can be made thinner, reducing weight thereof, and providing excellent press formability. Especially, since the protruded portion 15 of the side sill inner 14 has, on its transversely inner side, the wall portion 17 gradually extending transversely inward into the sectional inside of the rear side member 4 and connected to the rear side member 4 at the vicinity of the wall portion 10, the impact force F of the vehicle rear end collision can be smoothly transmitted from the rear side member 4 to the side sill inner 14.

The first and second reinforcements 22 and 23 are respectively connected to the rear side member 4 and the bottom portion of the protruded portion 15, and the upward flanges 22a and 23a formed on the opposing ends thereof are connected to the wall portion 17 interposed therebetween of the protruded portion 15. Thus, suspension load input to the first and second reinforcements 22 and 23 is transmitted to the wall portion 17, enhancing the supporting rigidity of the rear suspension (not shown).

Furthermore, a two-component structure, i.e., the first and second reinforcements 22 and 23, expands an area for the attachment (attaching span) of the rear suspension (not shown) and distributes load input, whereby plates of the first and second reinforcements 22 and 23 can be made thinner. Moreover, the upward flange 22b and the downward flange 23b formed on the mutually separated ends of the first and second reinforcements 22 and 23 are respectively connected to the wall portion 9 of the rear side member 4 and the main surface of the side sill inner 14. Thus, suspension load is transmitted to the wall portion 9 of the rear side member 4 and the main surface of the side sill inner 14, further enhancing the supporting rigidity of the rear suspension (not shown).

The present disclosure relates to subject matter contained in Japanese Patent Application No. 2001-317013, filed on Oct. 15, 2001, the disclosure of which is expressly incorporated herein by reference in its entirety.

The preferred embodiment described herein is illustrative and not restrictive, and the invention may be practiced or embodied in other ways without departing from the sprit or essential character thereof. The scope of the invention being indicated by the claims, and all variations which come within the meaning of claims are intended to be embraced herein.

What is claimed is:

1. A rear vehicle body structure comprising:
   a rear side member including,
      a front portion in front of a rear wheel house, extending in a vehicle longitudinal direction,
      a rear portion disposed on a transversely inner side of the front portion, extending in the vehicle longitudinal direction, and having a first wall on a transversely outer side thereof, and
      a middle portion having a second wall continuously provided from a front end of the first wall of the rear portion to a transversely outer rear end of the front portion;
   a longitudinally extending side sill inner, a rear portion of which is connected transversely outside the front portion of the rear side member; and
   a rear floor connected onto the rear side member and the side sill inner,
   wherein the rear portion of the side sill inner comprises a third wall configured to be accommodated within width of the rear side member to connect a bottom portion of the rear side member with the rear floor, and
   wherein the third wall of the side sill inner has, on its rear end, a flange portion configured to be fixed to the rear side member at a vicinity of a transition point from the first wall to the second wall, on substantially the same plane as the third wall.

2. The rear vehicle body structure according to claim 1, wherein the side sill inner includes a protruded portion gradually protruded transversely inward from a main surface thereof as it approaches rearward, accommodated within width of the rear side member, and a transversely inner side of the protruded portion constitutes the third wall.

3. The rear vehicle body structure according to claim 2, further comprising:

a first reinforcement positioned on transversely inner side of the third wall of the side sill inner and fixed to the bottom portion of the rear side member, and a second reinforcement positioned on transversely outer side of the third wall of the side sill inner and fixed to a bottom portion of the protruded portion, the first and second reinforcements having, on opposing sides thereof, flanges to be fixed to the third wall interposed therebetween.

4. The rear vehicle body structure according to claim 3, wherein the first reinforcement has, on its transversely inner side, the other flange to be fixed to a fourth wall of the rear side member longitudinally extending along a transversely inner side thereof, and the second reinforcement has, on its transversely outer side, the other flange to be fixed to the main surface of the side sill inner.

5. A rear vehicle body structure comprising:

a rear side member including,
   a front portion in front of a rear wheel house, extending in a vehicle longitudinal direction,
   a rear portion disposed on a transversely inner side of the front portion, extending in the vehicle longitudinal direction, and having a first wall on a transversely outer side thereof, and
   a middle portion having a second wall continuously provided from a front end of the first wall of the rear portion to a transversely outer rear end of the front portion;

a longitudinally extending side sill inner, a rear portion of which is connected transversely outside the front portion of the rear side member, the rear portion comprising a third wall configured to be accommodated within width of the rear side member;

a rear floor placed on the rear side member and the side sill inner, with its undersurface connected to a bottom portion of the rear side member through the third wall of the side sill inner; and connecting means for connecting, on substantially the same plane as the third wall of the side sill inner, a rear end of the third wall to the rear side member at a vicinity of a transition point from the first wall to the second wall.

6. A rear vehicle body structure comprising:

a rear side member including,
   a front portion in front of a rear wheel house, extending in a vehicle longitudinal direction,
   a middle portion extending rearward from the front portion around the rear wheel house, and
   a rear portion extending rearward from the middle portion, and having a longitudinally extending first wall on its transversely outer side;

a longitudinally extending side sill inner, a rear portion of which is connected transversely outside the front portion of the rear side member; and a rear floor connected onto the rear side member and the side sill inner, wherein the side sill inner has a longitudinally extending second wall accommodated within width of the rear side member for connecting a bottom portion of the rear side member with the rear floor, and wherein the second wall is connected to the first wall so that the first and second walls constitute a curvilinear surface extending in the vehicle longitudinal direction.

7. The rear vehicle body structure according to claim 6, wherein the bottom portion of the rear side member continuously extends over the front portion, the middle portion and the rear portion, and has a third wall along a transversely inner side thereof substantially parallel with the curvilinear surface of the first and second walls, and wherein the curvilinear surface of the first and second walls, the third wall, the bottom portion of the rear side member and the rear floor cooperate to form a closed sectional structure extending in the vehicle longitudinal direction.

* * * * *